(12) United States Patent
Kuhara

(10) Patent No.: US 6,908,235 B2
(45) Date of Patent: Jun. 21, 2005

(54) SUB-MOUNT AND OPTICAL RECEIVER USING THE SAME

(75) Inventor: Yoshiki Kuhara, Osaka (JP)

(73) Assignee: Sumitomo Electric Industries, Ltd., Osaka (JP)

(*) Notice: Subject to any disclaimer, the term of this patent is extended or adjusted under 35 U.S.C. 154(b) by 106 days.

(21) Appl. No.: 10/235,550

(22) Filed: Sep. 6, 2002

(65) Prior Publication Data
US 2003/0086653 A1 May 8, 2003

(30) Foreign Application Priority Data
Nov. 6, 2001 (JP) .................................. P.2001-340452

(51) Int. Cl.⁷ .................................................. G02B 6/36
(52) U.S. Cl. .......................... 385/88; 385/89; 385/92; 385/93; 359/113; 359/114; 359/115
(58) Field of Search ................... 385/33, 49, 88–89, 385/92–93, 24; 359/113–115, 124, 122, 154; 372/43, 50

(56) References Cited

U.S. PATENT DOCUMENTS 6,043,550 A * 3/2000 Kuhara et al. .............. 257/461
6,318,908 B1 * 11/2001 Nakanishi et al. ........... 385/89

FOREIGN PATENT DOCUMENTS

DE           35 43 558        6/1987

* cited by examiner

Primary Examiner—John R. Lee
Assistant Examiner—David A. Vanore
(74) Attorney, Agent, or Firm—Smith, Gambrell & Russell, LLP

(57) ABSTRACT

A sub-mount for fixing a photodiode is provided with an opening for transmitting an light, which is incident from below a light receiving portion of the photodiode. A wavelength selective filter having a wavelength selective function via a dielectric multilayer film is fixed to the opening for transmitting the incident light. Further, a light shading structure for shading scattering light incident from the side of the photodiode is provided and the whole light-receiving-portion-side surface is covered by potting with an opaque resin for absorbing scattering light incident from the light-receiving-portion-side surface of the photodiode, whereby an optical receiver excellent in wavelength selectivity is formed.

23 Claims, 6 Drawing Sheets

SUB-MOUNT AND OPTICAL RECEIVER USING THE SAME

BACKGROUND OF THE INVENTION

1. Field of the Invention

The present invention relates to a sub-mount for an optical receiver using optical communication and an optical receiver using the sub-mount and more particularly to an optical receiver in wavelength selectivity.

2. Description of The Related Art

With the development of communication technology using optical fibers, optical communication is now increasingly employed in subscribers' systems, to say nothing of trunk line systems.

In order to develop such optical communication systems further, optical transmitters as well as optical receivers are needed to be not only smaller in size but also lower in cost. With respect to the optical receiver, there has been examined a surface-mounting type optical receiver as shown in FIG. 4. FIG. 4 is a sectional view along an optical axis.

In German Patent No. DE3543558C2, for example, a V-groove 2 is formed in an silicon substrate 1 so as to fix an optical fiber 3. The V-groove 2 is formed by chemical etching. Receiving light 7 guided through the optical fiber is then radiated from an edge face of the optical fiber into space.

Further, light is reflected obliquely upward from a light reflective surface 4, and then the light is absorbed by the light receiving portion 6 of a light receiving element 5 (due to the p-n junction) and converted into an electric signal. The light reflective surface 4 is formed simultaneously with the V-groove.

Although the electric signal is not shown, it is taken out of electrodes each provided on an rear-surface of the semiconductor light receiving element and the surface of the light receiving portion via an Au wire.

Many Si benches can be formed less costly by lithography from a large silicon wafer. High sensitivity is stably obtainable as an optical fiber. The light receiving element are accurately positioned by forming a packaging position mark of the semiconductor light receiving element simultaneously with the V-groove in each Si bench. Therefore, the arrangement above is outstanding.

Such optical transmitters and receivers are usable in an optical communication system with wavelengths ranging from 1000 nm to 1700 nm. For example, a semiconductor laser using InP or InGaAsP as material is employed on the transmitter side. On the other hand, a semiconductor light receiving element (hereinafter called a photodiode) with mainly Ge, InGaAs or InGaAsP for use as a light receiving layer is employed on the receiver side.

There are also an optical transmission and reception system using two optical fibers: one for transmission and the other for reception, and an optical transmission and reception system using one optical fiber with different wavelengths: one wavelength for transmission and the other for reception.

FIG. 5 shows the latter case wherein wavelength dividers 103 and 105 are used to separate transmission light from reception light. For example, a transmission signal in a 1300 nm optical transmitter 101 is transmitted through the wavelength divider 103, and then the transmission signal propagated in the direction of travel 108 through an optical fiber 104. The propagated transmission signal is reflected from the wavelength divider 105, which has reverse wavelength characteristics. Then, the reflected transmission signal is received by a 1300 nm receiver 107.

On the other hand, a transmission signal in a 1500 nm optical transmitter 106 is transmitted through the wavelength divider 105, and then the transmission signal is propagated in the direction of travel 109 through the optical fiber 104. The propagated transmission signal is reflected from the wavelength divider 103. Then, the reflected transmission signal is received by a 1500 nm receiver 102.

In this case, an entrance of light from its own light source into the receiver portion due to scattering and reflection causes an optical crosstalk, thus resulting in extremely deteriorating reception sensitivity. Therefore, in a case of a transceiver for 1300 nm transmission and 1500 nm reception, for example, a light receiving portion is required not to show sensitivity to 1300 nm light as much as possible.

Moreover, so-called wavelength multiplex communication for use in simultaneously sending a number of optical signals having wavelengths close to each other through one optical fiber is being extensively carried out now.

FIG. 6 shows an example of the wavelength multiplex communication above wherein one optical fiber 104 is usable for transmitting signals having wavelengths ranging from λ1 up to λn over a long section. On a reception side, n of wavelengths are selected by a multi-wavelength divider 111 and received by a plurality of optical receivers.

For example, one wavelength λx is received by the xth optical receiver from above in FIG. 6. Even in this case, in order to provide sensitivity to the wavelength λx received, that is, sensitivity enough to deal with an extremely weak light received, it is needed to lower the sensitivity as much as possible to light having any wavelength other than λx that has not completely been removed by the wavelength divider.

Although FIG. 7 is quite similar to FIG. 6, in place of the multi-wavelength divider, an optical divider 112 for dividing light having every kind of wavelength into 1/n is employed, the optical divider 112 having no wavelength selective function. At this time, only light having a wavelength of λx is allowed to be incident on the xth optical receiver from above in FIG. 7 via a connector with a wavelength selective filter capable of selecting a desired wavelength out of a plurality of signals having wavelengths ranging from λ1 up to λn. Thus, it is needed to give the receiver a function for selecting only one wavelength λx from many wavelengths.

As set forth above, at all cases, a receiver is required to be highly sensitive to only one wavelength but least sensitive to any other wavelength so as to materialize optical communication using a plurality of wavelengths.

However, photodiodes are generally and broadly sensitive to light having wavelengths longer than a wavelength λg corresponding to band gap energy Eg characteristic of the material used. As λg=1670 in the case of InGaAs, for example, the material has high sensitivity to wavelengths ranging from 1000 nm up to 1650 nm.

Consequently, In case where light having a wavelength of 1300 nm is transmitted and light having a wavelength of 1550 nm is received, when the transmitted light having a wavelength of 1300 nm is scattered, reflected, and then returned from the wavelength divider or the optical connecter on the way, the photodiode is sensitive to this light. Therefore, the signal is not accurately reproduced because of a crosstalk.

When four multiplex signals having a plurality of wavelengths including, for example, 1480 nm, 1500 nm, 1520 nm and 1540 nm are transmitted, the photodiode need not be sensitive to any wavelength caused by scattering light generated in the wavelength divider other than the desired one. Notwithstanding, InGaAs is sensitive to all wavelengths.

Similarly, in the arrangement of FIG. 7, since wavelengths are not selected by the optical divider, the InGaAs becomes sensitive to all wavelengths though the satisfactory wavelength selective function is required. In any other light receiving element such as Ge or InGaAsP using as lightly different wavelength band, the element requires a special wavelength selective function likewise.

SUMMARY OF THE INVENTION

It is an object of the invention to provide a sub-mount having a wavelength selective function essential to wavelength multiplex communication and an optical receiver using the sub-mount with the intention of improving the performance and reproducibility as well as reducing the size and cost.

DETAILED DESCRIPTION OF THE PREFERRED EMBODIMENTS

Heretofore, there has been a well-known means for providing an optical receiver with wavelength selectivity by inserting a multilayer film filter into an optical fiber connector and coupling this combination to an ordinary optical receiver.

Figure 7:
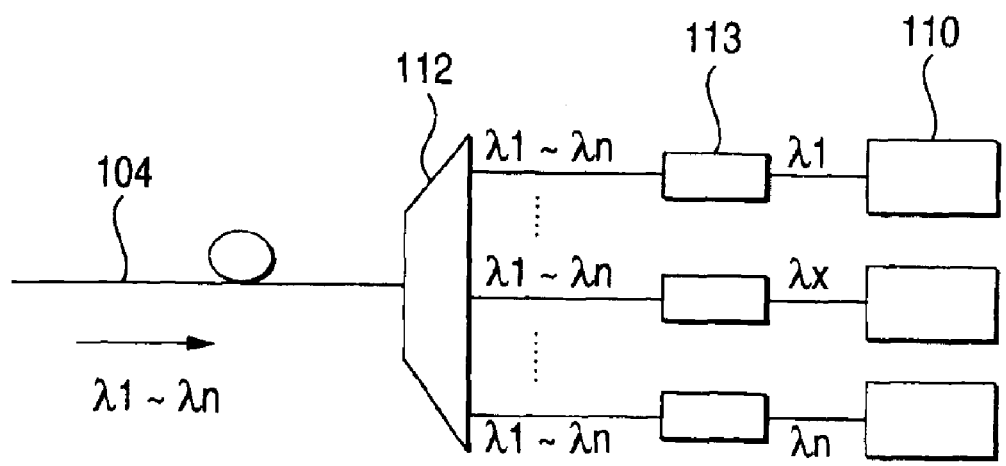
FIG. 7 is a conventional optical receiving system.

FIG. 7 shows an arrangement of such an optical receiver. However, this optical receiver becomes expensive and has the greater total length.

The present inventors have considered entirely newly integrating a filter function with a photodiode of an optical receiver.

A detailed description will now be given of embodiments of the invention by reference to the drawings.

Figure 1A:
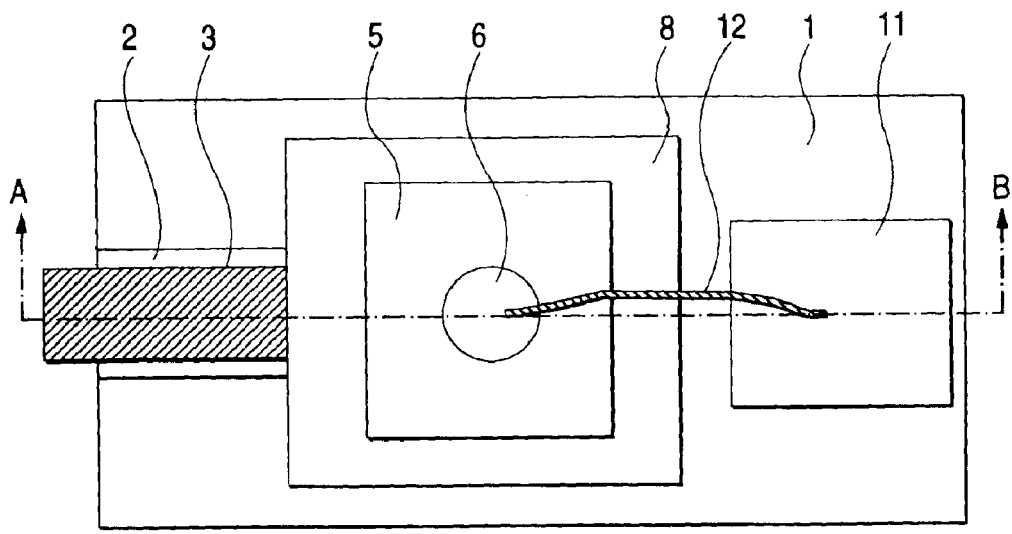
FIG. 1A is a plan view of an optical receiver as a first embodiment of the invention.
Figure 1B:
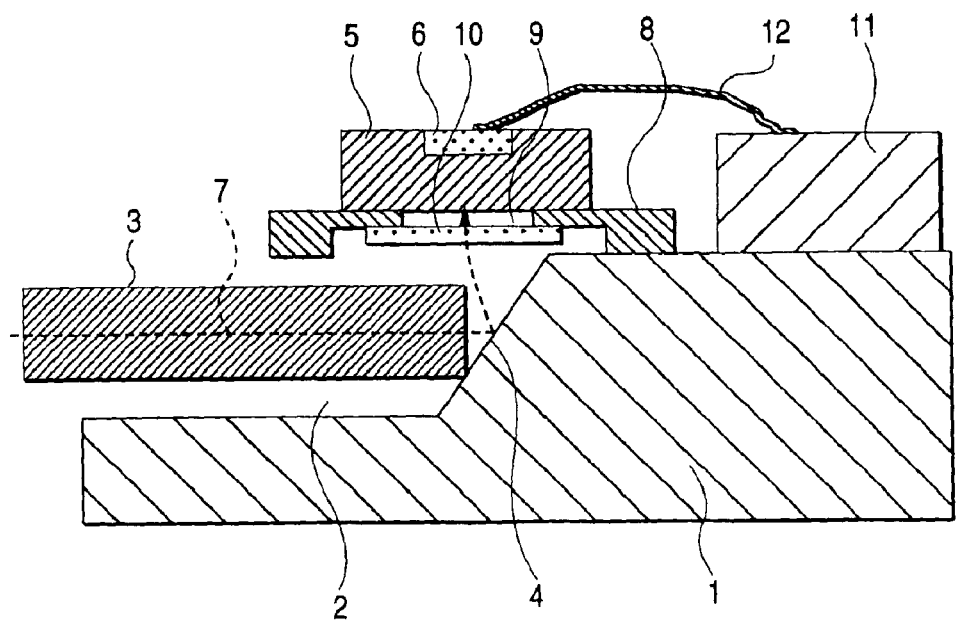
FIG. 1B is a sectional view taken on cut line A–B of FIG. 1A.

FIG. 1 shows a first embodiment of the invention: FIG. 1(a) is a plan view. FIG. 1(b) is a sectional view taken on cut line A–B of FIG. 1(a). Reference numeral 1 denotes a silicon bench prepared by forming a V-groove 2 for fixing an optical fiber 3 and a light reflective surface 4 by etching on a silicon wafer (100) 3 mm wide, 5 mm long and 1.5 mm thick.

The light reflective surface 4 may preferably be coated with Au in order to improve its refractive index. Reference number 8 denotes a sub-mount by using metal (aluminum, iron, brass or stainless) and ceramics (alumina, aluminum nitride, silicon nitride or boron nitride) as a quality of a material. The sub-mount 8 has an opening 9 for transmitting light to be received and is accurately positioned with respect to a metallized pattern pre-formed on the Si bench 1 and fixed with soldering material (Au, Sn or SnPb).

A wavelength selective filter 10 for use in transmitting only a desired wavelength ($\lambda x$) from among a plurality of incident wavelengths ($\lambda 1$ up to $\lambda n$) is bonded to the opening of the sub-mount with resin.

Laminating dielectric multilayer films ($SiO_2$ or $TiO_2$) having different refractive indexes are repeatedly laminated on the surface of a transparent substrate of glass or polyimide so that the wavelength selective filter (band pass filter) 10 is capable of selecting a wavelength. In this case, the band pass multilayer film filter (a central wavelength of 1500 nm and a transmissive wavelength width of 10 nm) formed on the polyimide substrate is employed.

Further, a photodiode (in FIG. 1, an rear-surface incident photodiode 0.5 mm×0.5 mm×0.3 mm thick) is fixed by soldering onto the sub-mount 8 with soldering material (AuSn or SnPb).

Incident light 7 from the optical fiber 3 is reflected obliquely upward from the light reflective surface 4. Only light having a wavelength of $\lambda x$ is selected by the filter 10 and incident on a light receiving portion 6.

As a photodiode for use in a range from 1000 nm to 1700 nm band, InGaAs or InGaAsP is often grown by means of epitaxial growth on an n-InP substrate to have a range from 0.002 mm to 0.005 mm in thickness. Zn is diffused in the central portion of the substrate so as to form a p-n junction, that is, the light receiving portion 6.

In this case, an rear-surface incident photodiode having a 0.004 mm thick InGaAs light receiving portion is employed.

As an N electrode on the back of the substrate, AuGeNi is used and as a P electrode on the surface of the light receiving portion, a Ti/Au electrode is used. A reflection preventive film of $SiO_2$ or SiON is formed over the opening 9 of the electrode in the back of the n-InP substrate.

The P electrode is electrically connected to a signal input pad of a pre-amplifier 11 (Si—IC, GaAs—IC) for amplifying an electric signal from the photodiode with an Au wire 12.

It is not essential to integrate the pre-amplifier on the Si bench but rather desirable because floating capacity and noise are effectively decreased while wiring is shortened; in this case, a 1 mm×1 mm Si—IC is employed.

With the arrangement of FIG. 7 for transmitting four wavelength multiplex signals of 1480 nm, 1500 nm, 1520 nm and 1540 nm; only 1500 nm signal was received accurately when reception results were measured while the connector having the filter was dispensed with.

When the optical crosstalk of other wavelengths was evaluated with the optical current ratio of the photodiode, even 1480 nm and 1520 nm closest to each other were found as good as −20 dB to −25 dB.

Figure 2A:
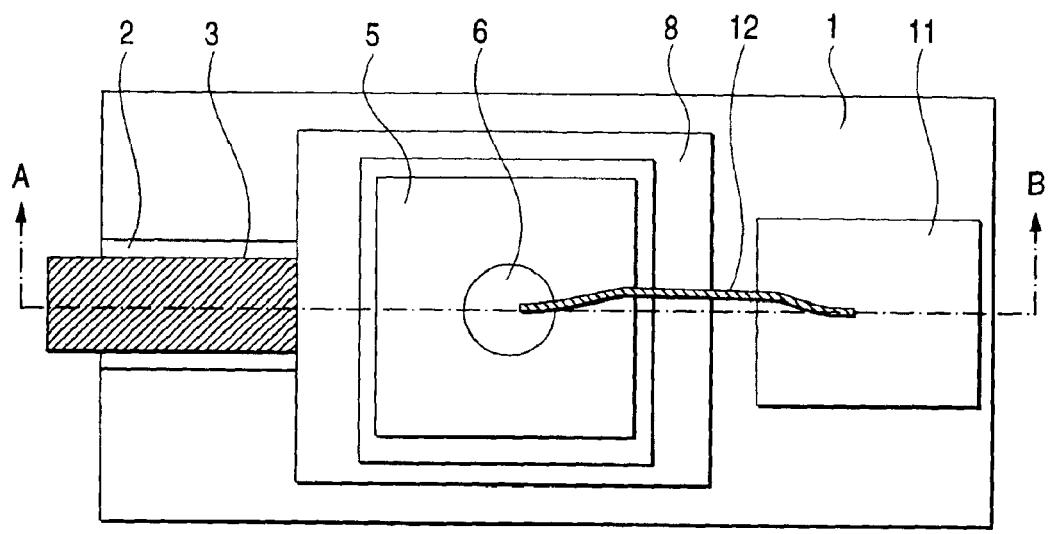
FIG. 2A is a plan view of an optical receiver as a second embodiment of the invention.
Figure 2B:
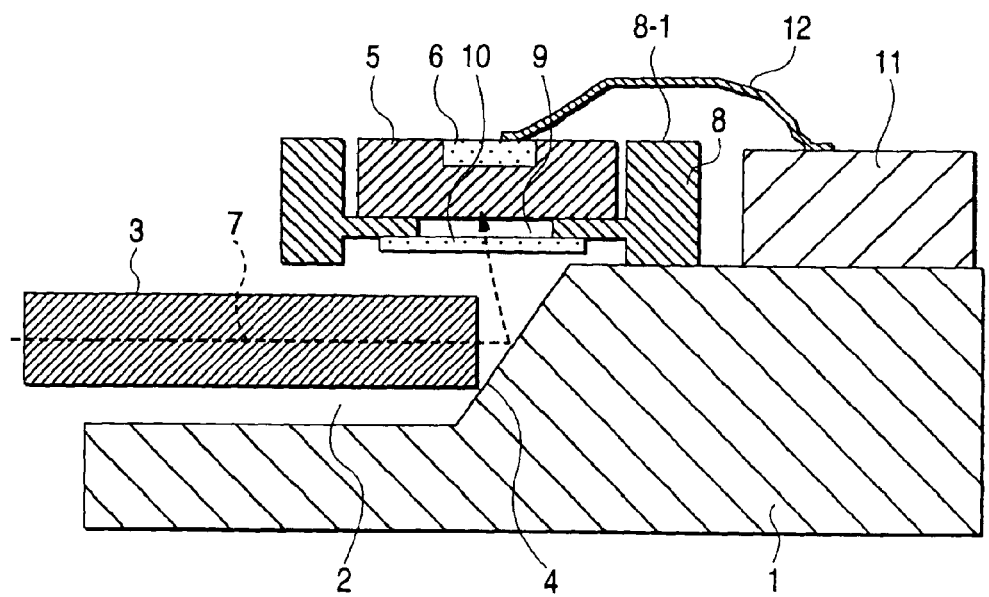
FIG. 2B is a sectional view taken on cut line A–B of FIG. 2A.

FIG. 2A is a plan view. FIG. 2B is a sectional view taken on cut line A–B of FIG. 2A.

The sub-mount 8 in FIG. 2 is characterized by having a light shading structure 8-1 whose height is substantially equal to or greater than the thickness of a photodiode 5 (to the extent that chip bonding or wire bonding can be carried out) An investigation into the reason why the crosstalk with wavelengths close to each other ranged from −20 dB to −25 dB according to the embodiment of the invention of FIG. 1 proved that the other wavelength was scattered and diffracted from the edge face of the photodiode to the light receiving portion 6.

Therefore, checking the incidence of the scattering light with the light shading structure makes the optical crosstalk sharply decrease.

In this case, the height of the light shading structure was set equal to that of the photodiode, namely, 0.3 mm. The inner dimensions of the light shading structure 8-1 were set at 0.7 mm×0.7 mm so that a photodiode (0.5 mm×0.5 mm) can be inserted without interfering with bonding and also can prevent the scattering light.

The dimensions above may be set by selecting the most suitable values in accordance with the size of the photodiode.

Desirably, the inner dimensions are within the range of approximately 0.1 mm to 0.3 mm wider than the photodiode outer dimensions by taking the outer periphery of the photodiode into consideration, since the scattering light can be prevented and the bonding can also carried out.

With the use of the same parts as those in FIG. 1, an evaluation was made of the embodiment of the invention of FIG. 2 wherein only the sub-mount is provided with the light shading structure. From the results of evaluation, the optical crosstalk was shown to improve from the level of −20 dB to −25 dB according to the embodiment of the invention of FIG. 1 to the level of −25 dB up to −30 dB.

Figure 3A:
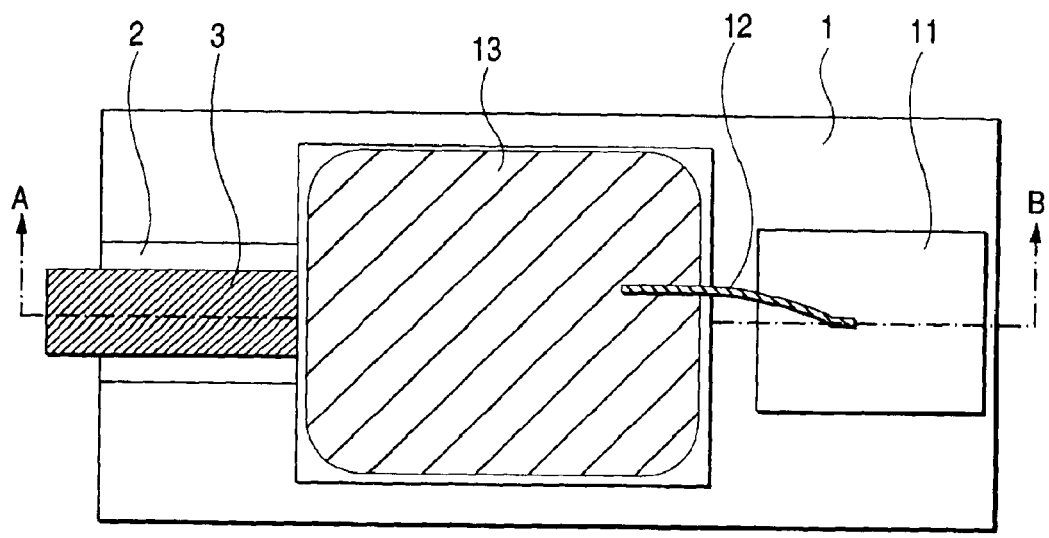
FIG. 3A is a plan view of an optical receiver as a third embodiment of the invention.
Figure 3B:
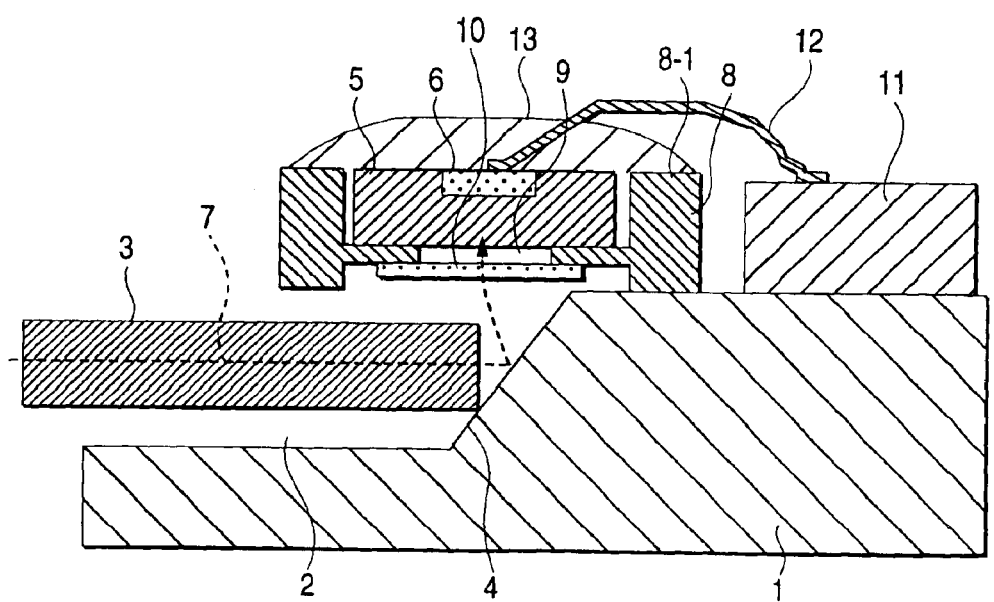
FIG. 3B is a sectional view taken on cut line A–B of FIG. 3A.
Figure 4:
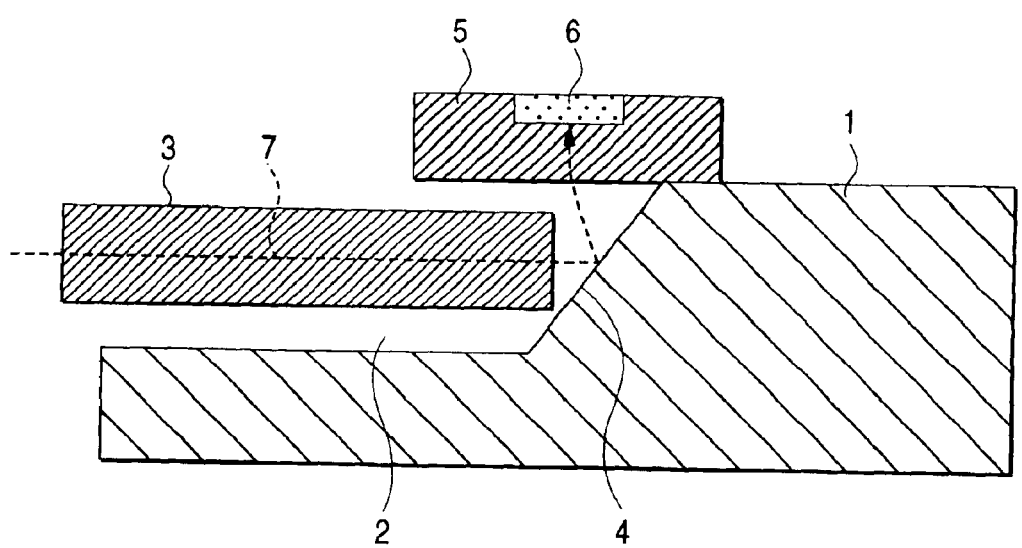
FIG. 4 is a conventional optical receiver.

FIG. 3 shows a third embodiment of the invention made as a result of investigation into the generation of scattering light even in the presence of the light shading structure 8-1.

The third embodiment of the invention is characterized by providing a shading structure that prevents light from being transmitted through the surface side of the light receiving portion of the photodiode 5, which is accomplished by potting opaque resin.

According to the embodiment of the invention as shown in FIG. 2, an investigation into the reason why the crosstalk with wavelengths close to each other ranged from −25 dB to −30 dB proved that scattering light with the other wavelength was reflected back even from a casing (not shown) for protecting the receiver and diffracted from above the photodiode to the light receiving portion 6. Therefore, potting resin that prevents light from being transmitted through the surface side of the light receiving portion of the photodiode makes the optical crosstalk sharply decrease.

In addition to the structure according to the embodiment of the invention of FIG. 2, the whole surface side of the light receiving portion of the photodiode in FIG. 3 was covered with opaque epoxy resin (e.g., with carbon black being added) by potting. In this case, resin is not necessarily used for the shading structure but a film and a plastic member may be employed for shading purposes.

Thus, as shown in FIG. 3, the whole surface of the photodiode is covered with the wavelength selective filter 10, or the opaque metallic or ceramic light shading structure 8-1 or a resin 13, which is opaque with respect to the intended wavelength band.

When the optical crosstalk was actually measured likewise with the arrangement of FIG. 3, the crosstalk could be decreased up to the marginal value determined by the basic characteristics of the wavelength selective filter ranging from −35 dB to −40 dB.

Figure 6:
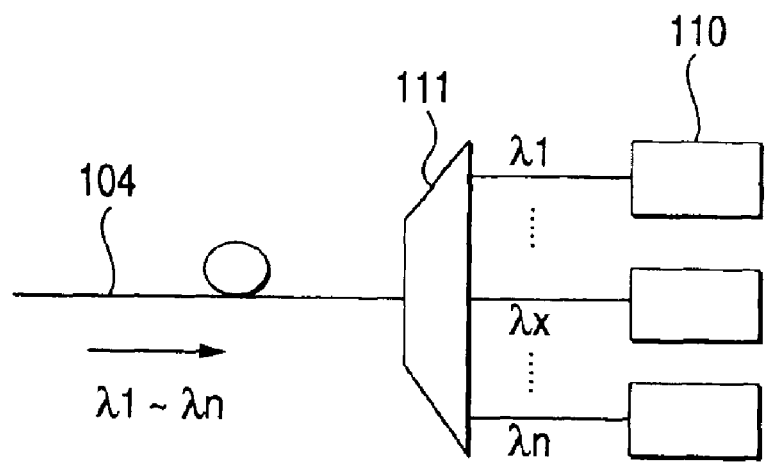
FIG. 6 is a conventional optical receiving system.

Needless to say, the invention is effective for the arrangement of not only FIG. 7 but also FIG. 6 and it was possible to obtain the effect of satisfactorily compensating for the insufficient wavelength selectivity of the optical divider.

Figure 5:
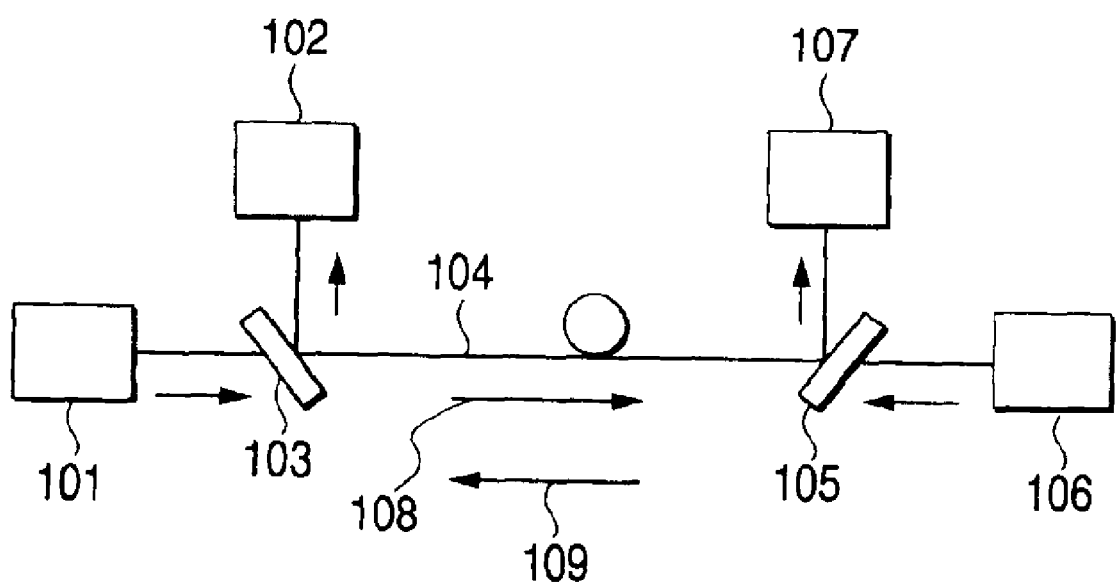
FIG. 5 is a conventional optical receiving system.

The invention is also applicable to the arrangement of FIG. 5. A transceiver on the left-hand side of FIG. 5 was arranged by combining the optical receiver according to the embodiment of the invention of FIG. 3 with a 1300 nm/1500 nm wavelength divider and a 1300 semiconductor laser.

Similarly, a transceiver on the right-hand side of FIG. 5 was arranged by replacing the wavelength filter according to the embodiment of the invention of FIG. 3 with a 1300 nm band pass filter, which was combined with a 1500 nm semiconductor laser.

When these two transceivers were set opposite to each other simultaneously with carrying out bidirectional communication, better communication without the crosstalk was made achievable.

A plurality of embodiments of the invention have been described above. However, the materials used to make the photodiodes, the wavelength selective filters, the benches and the optical transmission media, their structure and dimensions, the number of photodiodes mounted on each bench are not restricted in any way to those mentioned in the embodiments of the invention. The top-surface incident type photodiode may be packaged upside down and the optical fiber may also be replaced with a waveguide path.

It is possible to provide an optical receiver excellent in wavelength selectivity by fixing the wavelength selective filter to the sub-mount beforehand, furnishing the sub-mount with the light shading structure for shading scattering light and coating the P-side front with opaque resin by potting. Since the photodiode is integrated with the wavelength selective function, the performance is stabilized and moreover the size and cost of the optical receiver become reducible.

What is claimed is:

1. A sub-mount for mounting a surface incident type semiconductor light receiving element, the sub-mount comprising:
   a first side for mounting a wavelength selective filter at a light incident side of the semiconductor light receiving element; and
   a second side, opposite the first side, for mounting the light receiving element such that the wavelength selective filter, the sub-mount and the light receiving element are arranged in this order from a light incident of the filter.

2. A sub-mount according to claim 1, wherein a light shading structure is provided so that the light shading structure surrounds a periphery of an edge face of the semiconductor light receiving element.

3. A sub-mount according to any one of claim 1 to 2, wherein the sub-mount is made of a metallic material.

4. A sub-mount as claimed in claim 3, wherein the metallic material is any one of aluminum, iron, brass and stainless steel.

5. A sub-mount according to either claim 1 or 2, wherein the sub-mount is made of a ceramic material.

6. A sub-mount according to claim 5, wherein the ceramic material is selected from any one of alumina, aluminum nitride, silicon nitride and boron nitride.

7. A sub-mount according to either claim 1 or 2, wherein the wavelength filter is formed of a dielectric multilayer film, and wherein the dielectric multilayer film is formed on a transmissive substrate material.

8. An optical receiver comprising:
   a sub-mount;
   a rear-surface incident type photodiode as a semiconductor light receiving element disposed on one side of the sub-mount; and a wavelength filter disposed on the sub-mount at a side opposite said side thereof, wherein the rear-surface of the photodiode is disposed to face the wavelength filter.

9. The optical receiver according to claim 8, wherein the rear-surface of the rear-surface incident type photodiode is covered with a light shading member.

10. The optical receiver according to claim 9, wherein the light shading member is an opaque resin.

11. The optical receiver according to claim 10, wherein the opaque resin is an epoxy resin.

12. The optical receiver according to any one of claims 8 to 11, wherein an output signal of the rear-surface incident type photodiode is amplified by an pre-amplifier.

13. The optical receiver according to claim 8, wherein the wavelength filter is disposed on a light incident side of the semiconductor light receiving element.

14. The optical receiver according to claim 13, wherein a light shading structure is provided so that the light shading structure surrounds a periphery of an edge face of the semiconductor light receiving element.

15. An optical receiver comprising:

an optical transmission means;

a sub-mount;

a wavelength filter disposed on one side of the sub-mount; and a rear-surface incident type photodiode as a semiconductor light receiving element disposed on a side of the sub-mount that is opposite one side thereof, a rear-surface of the rear-surface incident type photodiode being disposed to face the wavelength filter, wherein the optical transmission means and the rear-surface incident type photodiode are formed on a silicon bench.

16. The optical receiver according to claim 15, wherein the rear-surface incident type photodiode includes any one of InGaAs materials and InGaAsP materials.

17. The optical receiver according to claim 15, wherein the wavelength filter disposed on a light incident side of the semiconductor light receiving element.

18. The optical receiver according to claim 15, wherein a light shading structure is provided so that the light shading structure surrounds a periphery of an edge face of the semiconductor light receiving element.

19. The optical receiver according to claim 15, wherein the optical transmission means includes an optical fiber.

20. The optical receiver according to claim 15, wherein the optical transmission means includes an optical waveguide.

21. A sub-mount according to claim 2, wherein the sub-mount has an opening portion, and wherein the wavelength selective filter is fixable over the opening portion by a resin.

22. The optical receiver according to either claim 9 or 18, wherein the sub-mount has an opening portion extending therethrough.

23. The optical receiver according to claim 22, wherein the wavelength filter is fixed over the opening portion of the sub-mount by a resin.

* * * * *